(12) United States Patent
Dean

(10) Patent No.: US 6,622,846 B1
(45) Date of Patent: Sep. 23, 2003

(54) AIRCRAFT CARGO LOADER

(75) Inventor: William C. Dean, Houston, TX (US)

(73) Assignee: Stewart & Stevenson, Houston, TX (US)

(*) Notice: Subject to any disclaimer, the term of this patent is extended or adjusted under 35 U.S.C. 154(b) by 271 days.

(21) Appl. No.: 09/301,985

(22) Filed: Apr. 29, 1999

Related U.S. Application Data

(60) Provisional application No. 60/083,667, filed on Apr. 30, 1998, provisional application No. 60/083,610, filed on Apr. 30, 1998, provisional application No. 60/083,666, filed on Apr. 30, 1998, and provisional application No. 60/083,668, filed on Apr. 30, 1998.

(51) Int. Cl.[7] .......................... B65G 13/02; B65G 47/52
(52) U.S. Cl. ................. 198/370.09; 198/787; 414/529; 244/137.1
(58) Field of Search ............... 193/35 MD; 198/370.09, 198/786, 787; 414/495, 529, 532; 244/137.1

(56) References Cited

U.S. PATENT DOCUMENTS

| | | | | |
|---|---|---|---|---|
| 3,645,379 A | * | 2/1972 | Kornylak | 198/370.09 |
| 3,710,917 A | * | 1/1973 | Black et al. | 198/370.09 |
| 3,944,096 A | | 3/1976 | Carder | |
| 4,978,272 A | * | 12/1990 | Leon | 414/529 |
| 5,101,960 A | * | 4/1992 | Simons | 198/787 X |
| 5,396,977 A | * | 3/1995 | Lantis et al. | 198/787 X |
| 5,630,694 A | * | 5/1997 | Ihara | 414/495 |
| 6,071,063 A | * | 6/2000 | McGrath et al. | 414/529 |

FOREIGN PATENT DOCUMENTS

| | | | | |
|---|---|---|---|---|
| JP | 61-53287 | * | 11/1986 | 414/529 |
| SU | 1770228 | * | 10/1992 | 198/370.09 |

OTHER PUBLICATIONS

FMC Corporation, Commander 30Universal Lower Deck and Main Deck Loader, Copyright 1995, Six (6) pages.

* cited by examiner

Primary Examiner—James W. Keenan
(74) Attorney, Agent, or Firm—Loren G. Helmreich; Browning Bushman, P.C.

(57) ABSTRACT

A cargo loader platform having an array of roller assemblies on the deck thereof which are capable of moving a container longitudinally or laterally or rotating it includes several independently driven groups of roller assemblies. The groups include groups along the sides of the platform having drive axes parallel to the loader axis, groups near the center of the platform having a separate drive axes that are perpendicular to the loader axis, and groups down the center of the platform having drive axes parallel to the loader axis. Large diameter, driven cylindrical rollers are mounted on the outer sides of the sides and rear end of the platform to assist in moving cargo onto the deck.

5 Claims, 8 Drawing Sheets

AIRCRAFT CARGO LOADER

CROSS-REFERENCE TO RELATED APPLICATIONS

The present invention relates to inventions disclosed in provisional applications entitled Split Roller Wheel For Use With Aircraft Cargo Loaders, Ser. No. 60/083,667, Inventor: William C. Dean; and Aircraft Cargo Loader With Quick-Release Lift-Assisted Handrail, Ser. No. 60/083,610, Inventor: Stephen D. Sykes, all of which were filed Apr. 30, 1998, concurrently with the priority provisional applications, entitled Aircraft Cargo LoaderWith Multi-CenterPlatform Deck, Ser. No. 60/083,667, Inventor: William C. Dean; and Aircraft Cargo Loader With Platform Leveling System, Ser. No. 60/083,666, filed Apr. 30, 1998 inventor: Stephen D. Sykes and Aircraft Cargo Loader With Platform Leveling System and Large DiameterRollers, Ser. No. 60/083,666, Inventor: Stephen D. Sykes, and are incorporated herein in their entireties. This application claims the benefit of provisional application Ser. No. 60/083,663, filed Apr. 30, 1998.

FIELD OF THE INVENTION

The present invention relates to a loader and particularly to the types of mobile loaders that incorporate at least one variable height platform, such as are used for loading and unloading freight in the cargo holds of aircraft. Still more particularly, in accordance with one aspect of the invention, the present invention relates to a cargo loader platform having a deck that includes an improved array of friction reducing drivable roller assemblies that cause longitudinal and lateral movement of pallets and containers. In accordance with another aspect of this invention, it relates to a loader of this type having an improved arrangement of cylindrical rollers on the sides and end of the container deck which facilitates movement of cargo onto the deck.

BACKGROUND OF THE INVENTION

Mobile loaders are essential equipment for the loading and unloading of containerized or palletized cargo into and from the holds of aircraft. Such loaders often employ two platforms. One platform, usually referred to as the bridge, provides an interface with the sill of cargo door. The bridge is supported on a hydraulic lift, which provides a high degree of control and stability and allows the height of the bridge to be adjusted to correspond to the height of the aircraft cargo door. Once the bridge is positioned, it typically remains in a substantially constant position with respect to the aircraft, although it is known to make slight adjustments to the height of the bridge to compensate for shifts in the height of the aircraft cargo door as the plane is loaded or unloaded. Although the balance of the following discussion is presented in terms of a loading process, in which cargo is placed onto an aircraft, it will be understood all concepts apply equally to unloading processes.

The second platform, cycles up and down during the loading process, delivering cargo to the bridge. The platform is typically raised and lowered by means of hydraulic systems acting through appropriate mechanical linkages which ensure that the platform maintains a substantially horizontal attitude. For example, a pair of chains powered by hydraulic cylinders cooperate with a platform squaring or stabilizing scissors to ensure that the platform moves vertically during raising and lowering.

The decks of the platform and bridge sections of cargo loaders are typically provided with some type of rollers or other friction-reducing device, so that containers and pallets can be easily slidably moved across the deck and/or re-oriented. In addition, the decks are provided with some type of drive device for imparting motive force to containers and/or pallets. As used hereinafter, both closed containers with relatively rigid bases and pallets having relatively flexible bases with loads of cargo secured thereto are referred to in a generic sense as cargo containing "objects".

Because of the nature of the loading process, which may entail lateral, longitudinal and rotational movement, the friction reducing devices on the deck surface must rotate in whichever direction is required to achieve the desired movement, or at least not impede the desired movement. Thus, suitable friction reducing devices can be casters, rollers, wheels, or some combination thereof, and can be actuable in and out of engagement with the underside(s) of the cargo. Similarly, suitable drive devices include motor driven rollers, belts or wheels and can also be actuable in and out of engagement with the underside(s) of the cargo containing objects.

As aircraft and cargo containers have grown in size, it has become increasingly difficult to carry out the loading and unloading of aircraft. First, the sheer size and mass of containers up to 40 feet long and weighing up to 120,000 pounds make handling formidable. In addition, containers are often shaped to correspond to a particular position or orientation within the cylindrical hull of the aircraft. In order to take advantage of this conformity, it is necessary that each container by correctly oriented as it enters the cargo bay. It is often the case, however, that as the containers are delivered to the aircraft cargo loader, they are not oriented correctly. Hence, it is often desired to re-orient a container prior to loading it on the aircraft. In addition, of course, it is necessary to shift the container longitudinally or laterally during the loading process. It will be understood that the concepts disclosed herein with respect to a loading process have equal applicability to unloading and other cargo-handling processes. Because loading is often performed under rigid time constraints, it is desirable that all loading and reorientation steps occur at the fastest possible rate.

Prior art systems have been disclosed that attempt to provide a safe, controlled and effective mechanism for quickly performing the desired handling steps. These typically entail rollers or belts that are actuable in combination, such as those disclosed in U.S. Pat. Nos. 3,944,096 and 4,978,272. It has been found, however, that prior art systems are limited in the size of container that they can maneuver and in the range of handling stems that they can perform. It is therefore desired to provide a cargo loader that is capable of quickly, effectively and safe handling and re-orienting containers over a range of container types and sizes.

It is also known to provide rotatable cylindrical rollers on the outer sides of platform of this type in an effort to compensate for disparity in height between the platform deck and the bed of the truck from which the cargo is to be loaded onto the platform. In many instances, however, the disparity in height between the truck deck and the deck of platform is so great that cargo cannot easily be transferred to the platform despite the use of the rollers. These conditions occur for various reasons, including uneven ground, insufficient tire inflation on the truck, or equipment mismatch.

The present invention comprises a loader having a platform deck that includes an array of roller assemblies that are arranged in a plurality of groups. The groups include groups along the sides of the platform having longitudinal drive axes parallel to the loader axis, groups near the center of the platform having separate lateral drive axes that are perpendicular to the loader axis, and groups down the center of the platform having longitudinal drive axes parallel to the first mentioned group. The groups are independently motor-driven and rotatable about separate axes, so that different combinations of the groups can be used to achieve a desired movement of the cargo, including lateral and longitudinal movement and rotation. Groups that are not powered during a given load transfer operation are passive. Passive groups either provide reduced friction support or are not loaded during a given operation.

In accordance with another object of the invention, a loader constructed in accordance with the present invention includes load transfer cylindrical rollers on the sides and end of the deck that have much larger diameters than previously known rollers of this type. For example, it is preferred that the diameter of transfer rolls be at least eight, and more preferably at least ten, inches.

BRIEF DESCRIPTION OF THE DRAWINGS

For a more detailed description of the present invention, reference will now be made to the accompanying Figures, wherein.

DETAILED DESCRIPTION OF THE PREFERRED EMBODIMENTS

Figure 1:
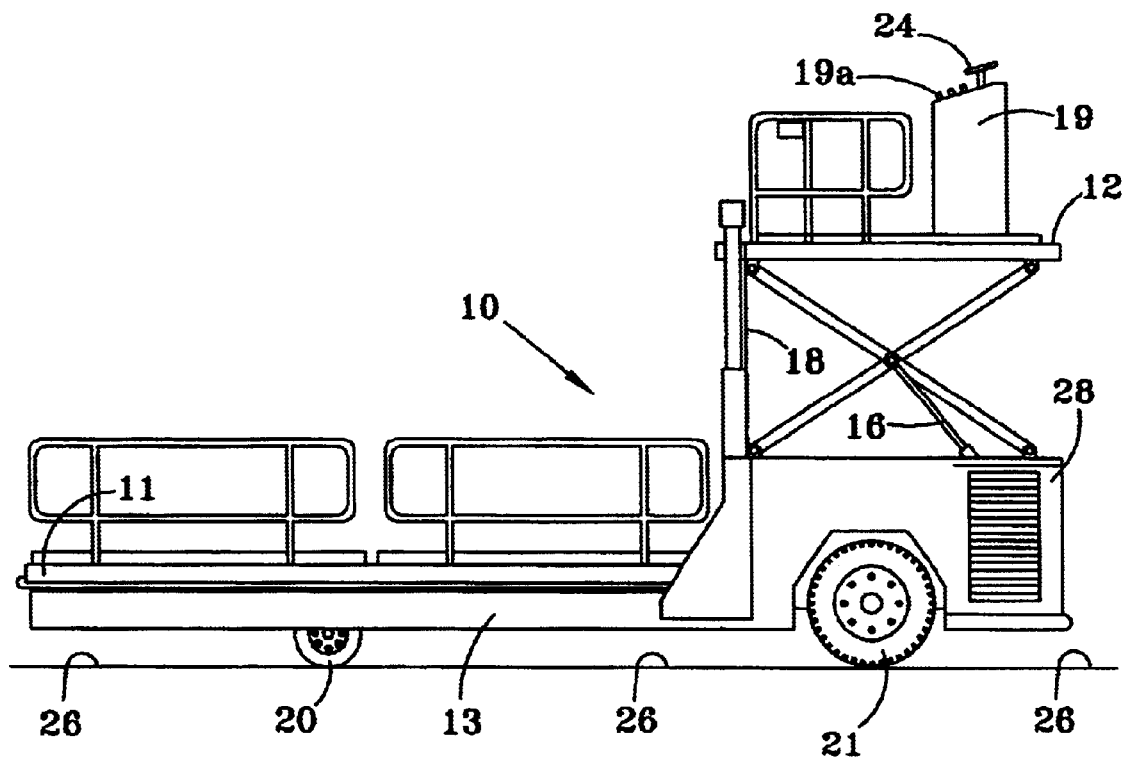
FIG. 1 shows a typical cargo loader with its bridge raised and its platform lowered.
Figure 2:
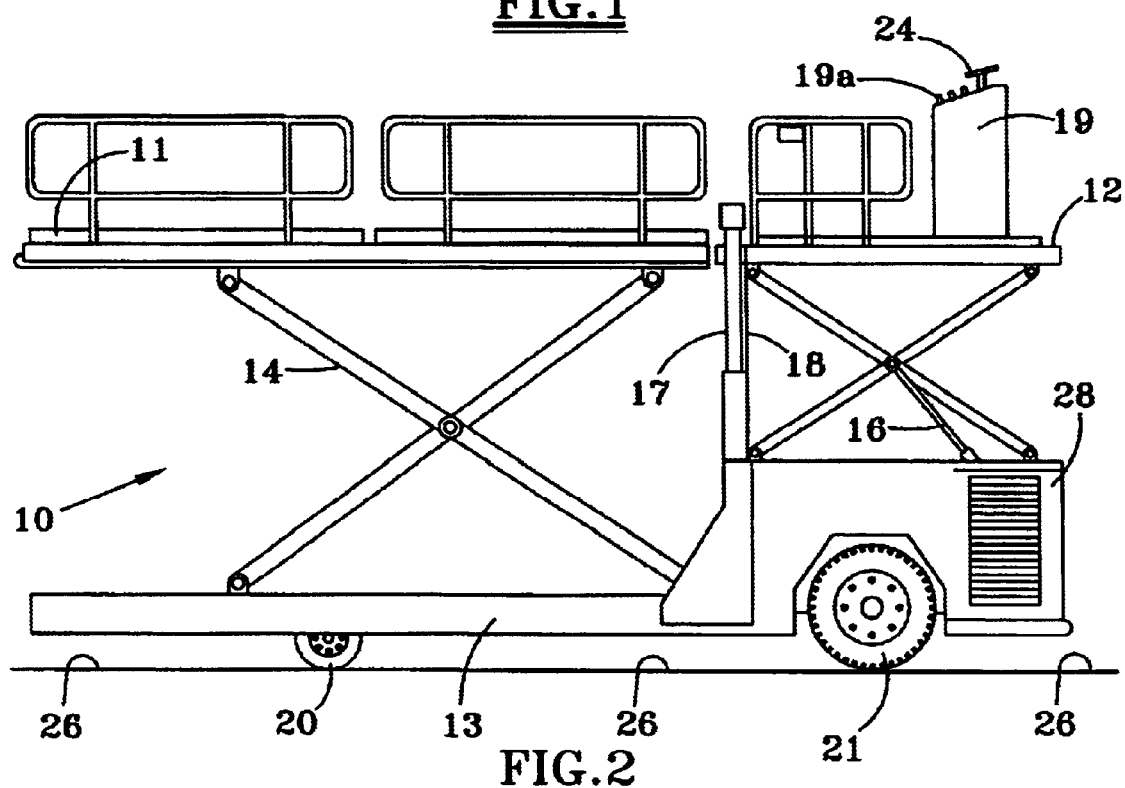
FIG. 2 shows the cargo loader of FIG. 1 with its platform raised to the level of the bridge.

Referring initially to FIGS. 1 and 2, a typical cargo loader 10 includes a loading/unloading platform 11, bridge 12, and chassis 13 on which both are mounted. Platform 11 is supported and maintained in a level attitude with respect to chassis 13 by a scissors 14. Bridge 12 is similarly supported on a second scissors 15, which is raised and lowered by a pair of hydraulic rams 16. Platform 11 is raised by means of a hydraulic lift 17 and leaf chains 18, with each chain being secured to platform 11 at one end and to chassis 13 at the other end. Attached to the bridge 12 is a control station 19 that includes a control panel 19a. The chassis 13 is supported on four wheels, of which the rear pair 20 are free-wheeling and the front pair 21 are connected to steering and drive mechanisms (not shown). Control station 19 further includes a steering wheel 24 linked to the front wheels 21 for controlling and steering the loader. Mounted on the front of the chassis 13 is a housing 28 in which batteries (not shown), a motor/generator means (not shown) and associated transmission means (not shown) etc. are housed.

Figure 3:
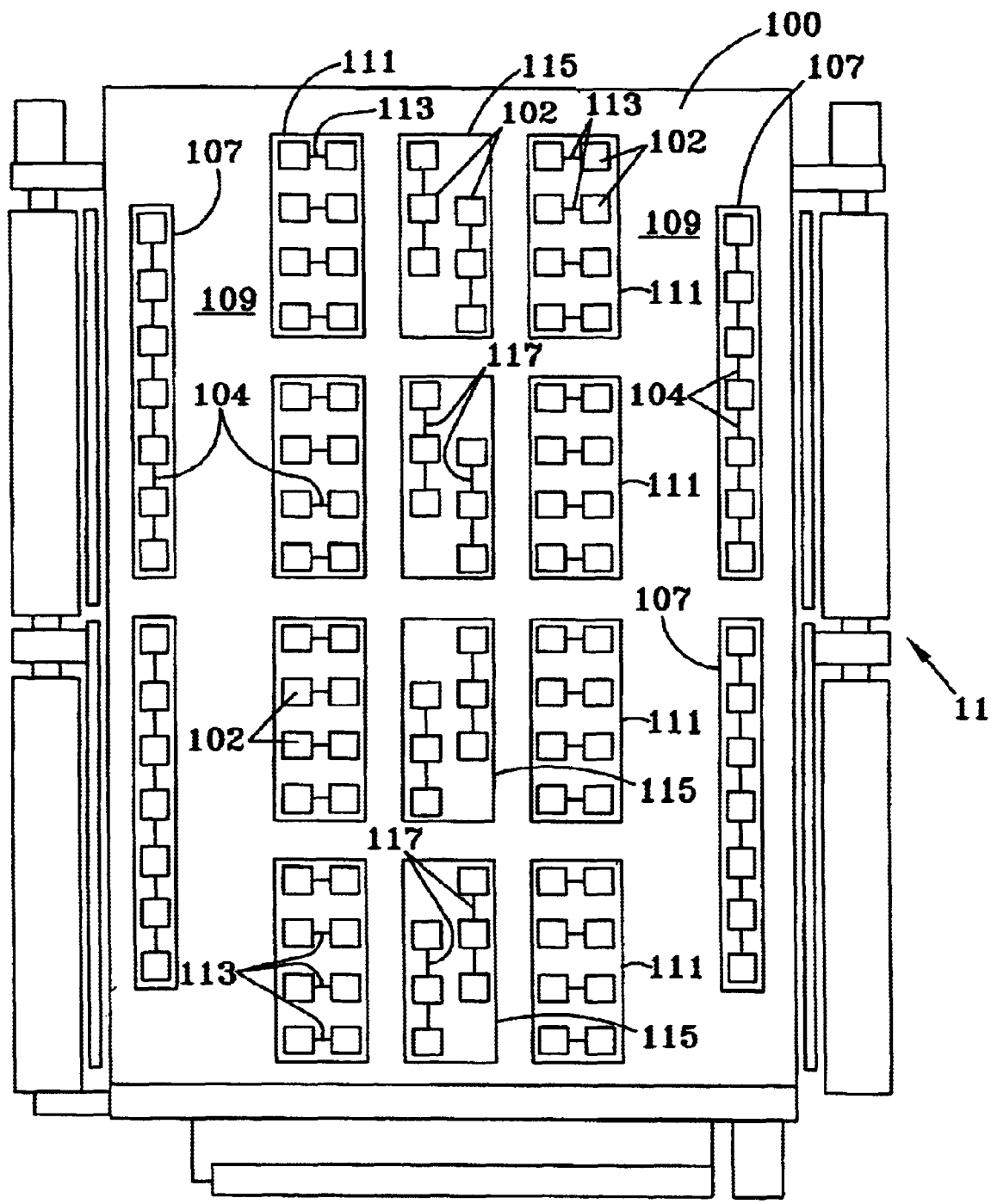
FIG. 3 is a partially schematic plan view of the platform deck of the loader of FIG. 1 showing an arrangement of rollers according to the present invention.

Referring now to FIG. 3, one preferred embodiment of the present multi-center platform deck 100 includes an array of ninety-six friction reducing devices, shown schematically as boxes 102. According to a preferred embodiment, the friction reducing devices comprise assemblies of roller wheels, as shown and described in copending patent application entitled Split Roller Wheel and Method of Assembly, filed concurrently herewith by Stephen D. Sykes, and assigned to the assignee of the patent application. Thus, as shown in such application, as well as Provisional Application No. 60/083,667, referred to above, the roller wheels have a wheel hub mounted on a drive axle. The wheel hub supports a plurality of peripheral rollers which make up an assembly to allow movement of a load in a direction parallel to the drive axle. One type of friction reducing device that is particularly preferred for use in the present invention is a split roller wheel, as described in detail in the above-mentioned copending application.

In the drawings, the short lines 104 connecting adjacent boxes represent the drive axles on which the hubs of those roller wheels are mounted and about which they rotate. Where a group of roller wheels is shown sharing a drive axle, it will be understood that those roller wheels are preferably driven as a "group," by a motor that is dedicated to that group. Nevertheless, it will also be understood that each group that is defined could be replaced by one or more independently driven roller wheels. Each group of rollers is independently controlled and driven and thus can be driven simultaneously or not, and in the same or opposite directions.

Along each side of platform 11 are two pairs of seven roller assemblies 107, spaced apart along a single longitudinal axis that is parallel to the loader axis. Adjacent the groups 107 is a dead space 109. On the underside of deck 100, space 109 is occupied by the several motors required to drive each of the adjacent groups. On the other side of dead space 109 and near the center of deck 100 are eight groups 111 of eight roller assemblies, with the lateral drive axis of each pair being perpendicular to the loader axis. Along the center line of deck 100 are four groups 115 of six roller assemblies each. Each group of six 115 comprises two offset sets 117 of three roller wheel assemblies each. The longitudinal drive axis of each group 117 is parallel to the loader axis. The spaces in each group 115 formed by the offsets are occupied by the motors used to drive the sets 117.

Referring now to FIGS. 4–7 the use of the preferred array to effect various types of container movement will be described. In each of FIGS. 4–7, the type of container movement illustrated is represented by a large phantom arrow superimposed on the platform. The direction of rotation of the roller wheels in each active group is indicated in the Figures by a solid arrow extending across that group. If a group is passive during a procedure, no arrow is shown.

Figure 4:
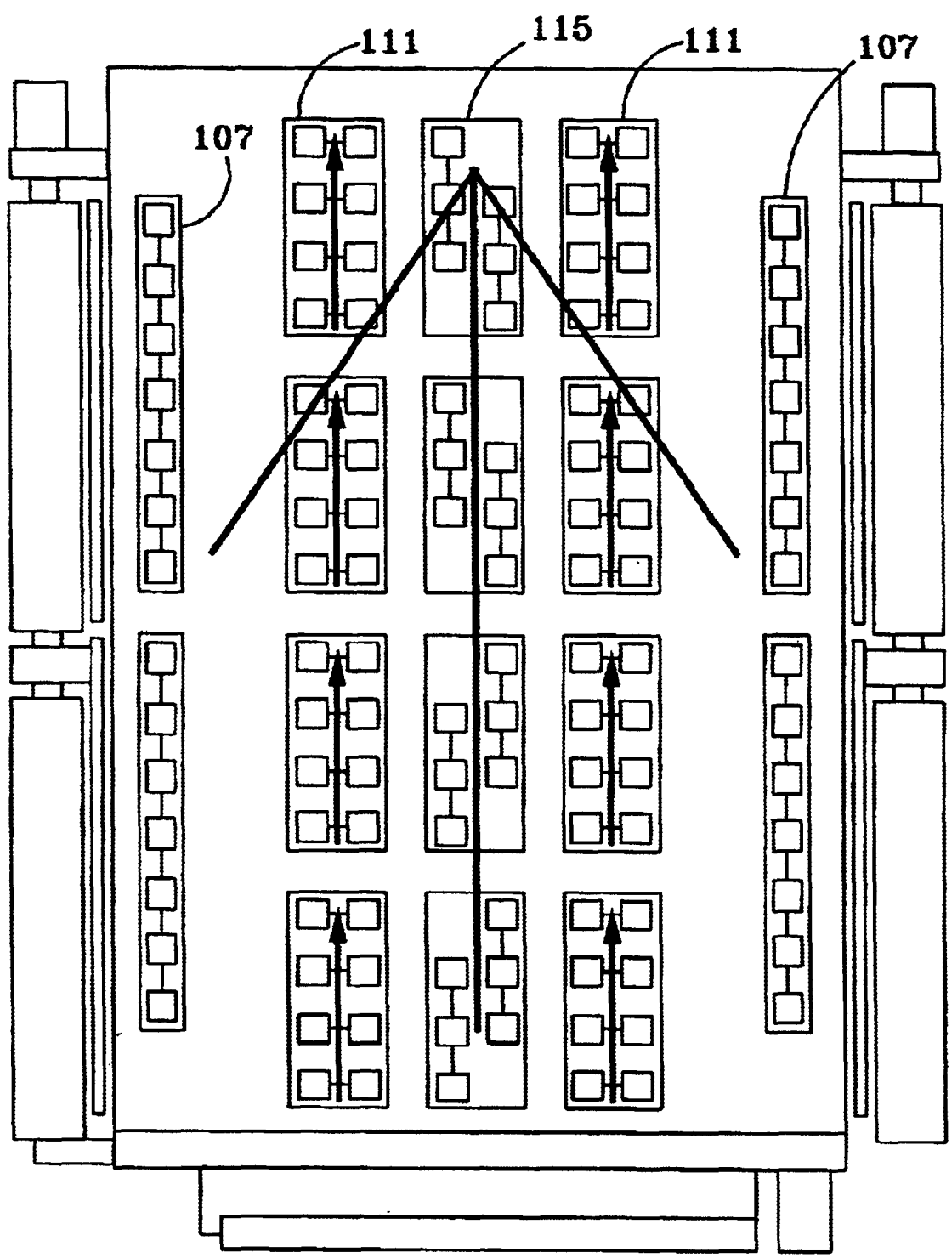
FIGS. 4–7 are schematic diagrams of arrays of rollers of the present invention, illustrating various modes of operation.
Figure 5:
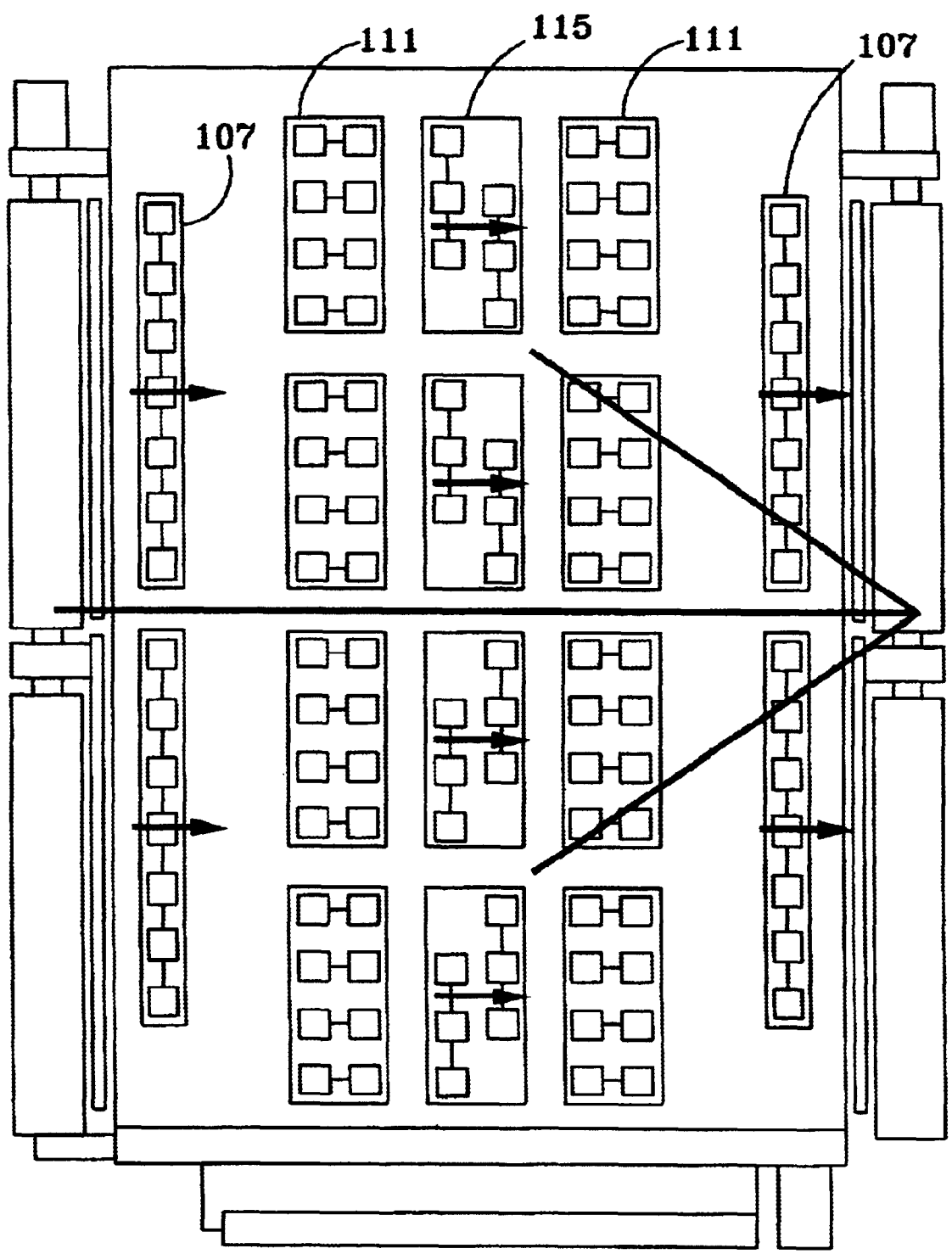

Referring initially to FIG. 4, the mode for conveying a container longitudinally is shown. In this mode, only groups 111 are driven, while the roller wheel assemblies of groups 107 and 115 are passive. This mode is typically used to advance a container onto or off of the bridge. In FIG. 5, the mode for conveying a container laterally is shown. In this mode, groups 107 and 115 are driven, while the roller wheel assemblies in groups 111 are passive. Since the groups are independently driven, this mode can be used to align smaller containers by laterally shifting them relative to each other using subsets of groups 107 and/or 115.

Figure 6:
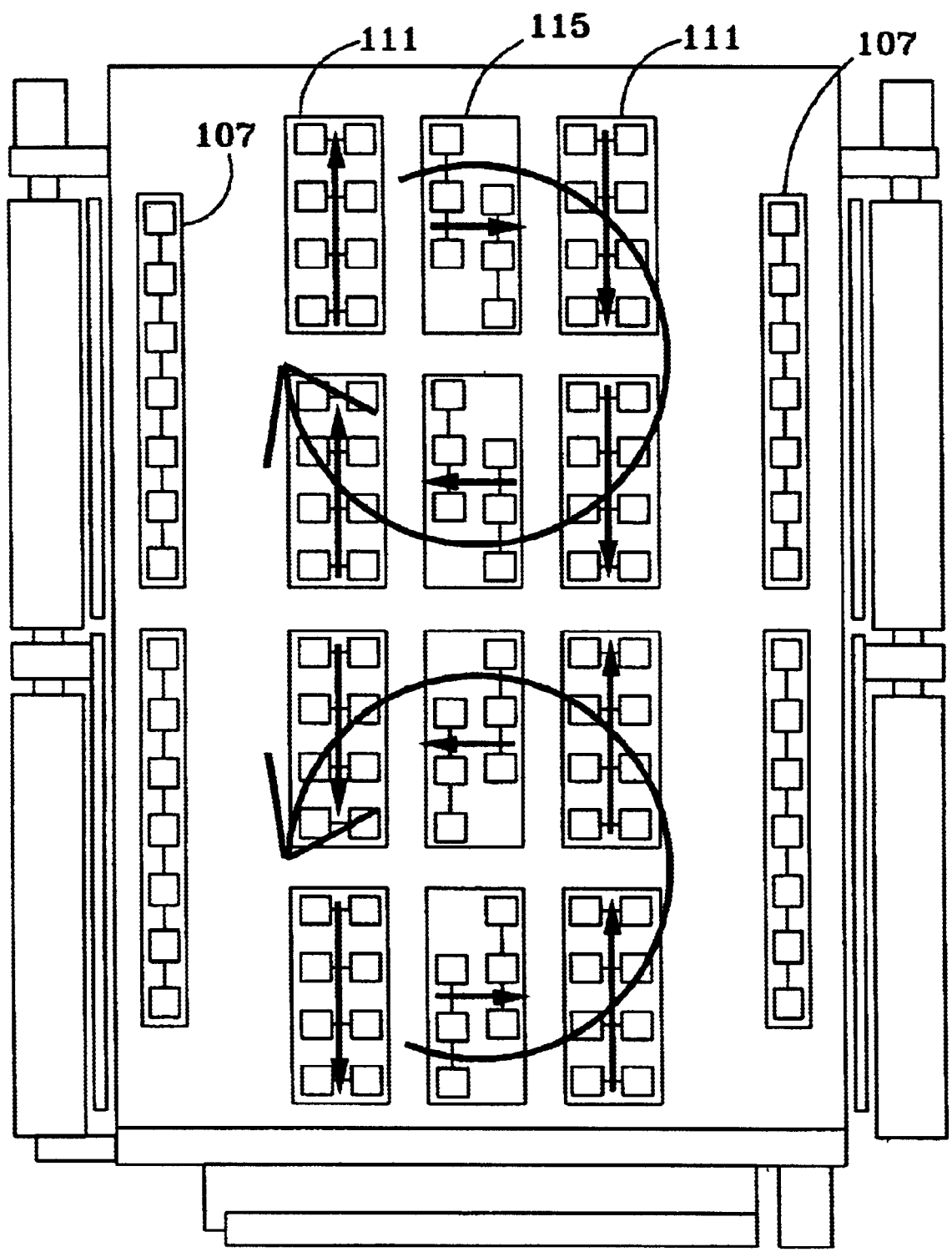

In FIG. 6, the mode for rotating a container about one or two centers of rotation is shown. In this mode, for each center of rotation, the adjacent groups 111 and 115 are driven in opposite directions, while the roller wheel assemblies in groups 107 are passive. If the containers being rotated are small enough, two containers can be simultaneously rotated using this mode. Also, while FIG. 6 shows rotation in opposite directions about the two centers, the direction of either or both rotation sets can be reversed.

Figure 7:
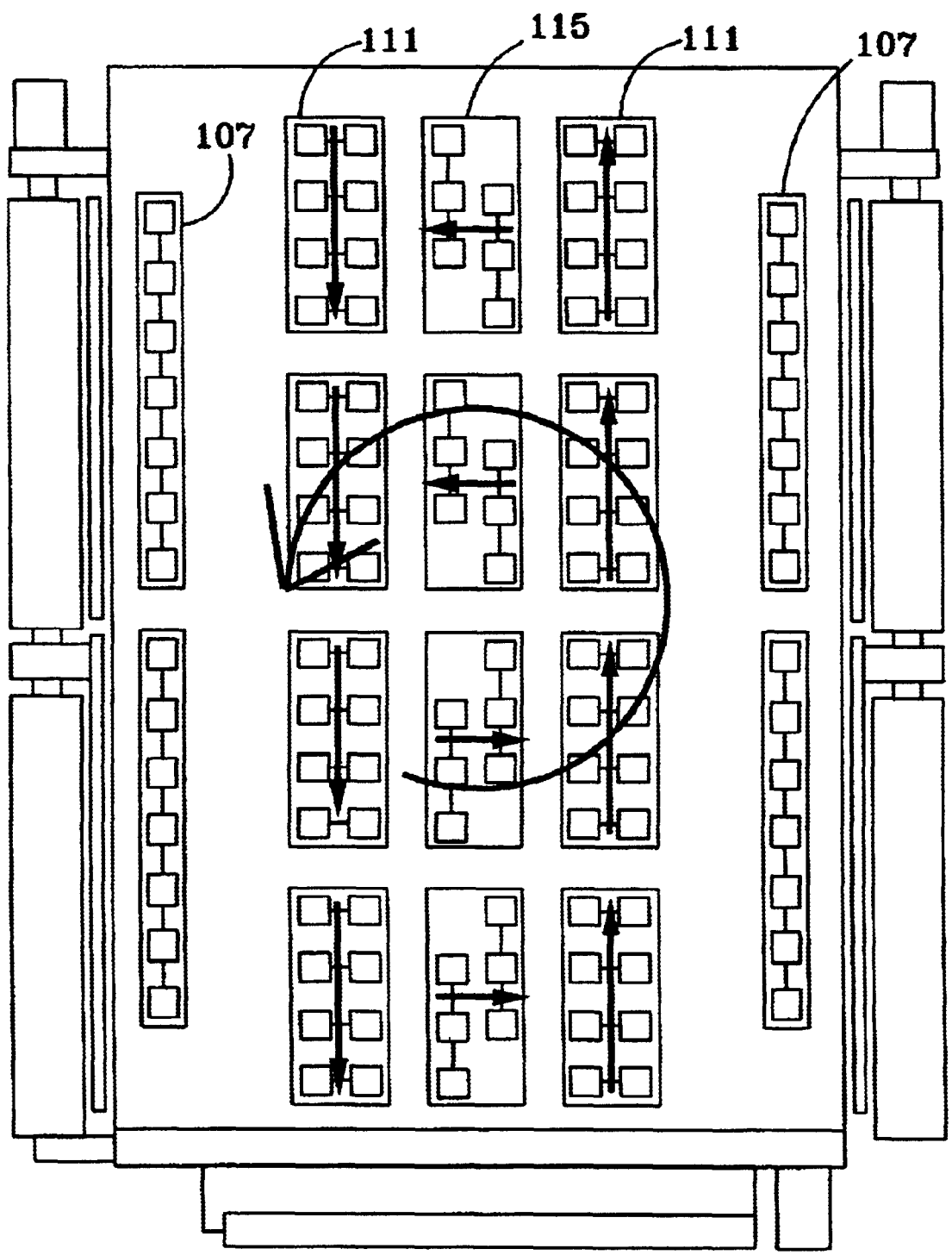

In FIG. 7, the mode for rotating a container about a single central axis is shown. In this mode, groups 111 and 115 are driven, while the roller wheel assemblies in groups 107 are passive. Although this mode can be used with any cargo containing objects, it is particularly suited to rotation of large pallets. This is because large pallets may not have room to rotate about the forward rotational center, may become unstable on a smaller platform, or could become stalled if the moment applied by the drive rollers were insufficient to overcome their frictional engagement with the deck. The present invention provides large arrays of roller wheel assemblies that is capable of adequately supporting large containers in each phase of loading or re-orientation.

The modes of movement illustrated in FIGS. 4–7 are not comprehensive of the capabilities of the present loader. Because a container will move in response to the sum of the force vectors applied to it, the independently driven groups can be individually selected to produce an infinite range of adjustments to container position.

In can be seen that, depending on the type of container movement desired, not all of the roller wheel assembly groups are active. Furthermore, it will be understood that for each type of movement illustrated, the opposite movement can be effected by reversing the direction of rotation of each active group of roller wheel assemblies. In a preferred embodiment, for purposes of lateral or longitudinal movement, all of the drive roller assemblies in the front half of the platform are controlled by one joystick, while all of the drive roller assemblies in the rear half of the platform are controlled by a second joystick. The two joysticks can be optionally linked when large pallets are being moved. For control purposes, it is preferred that rotational movement about each of the three centers be controlled by separate switches.

Figure 8:
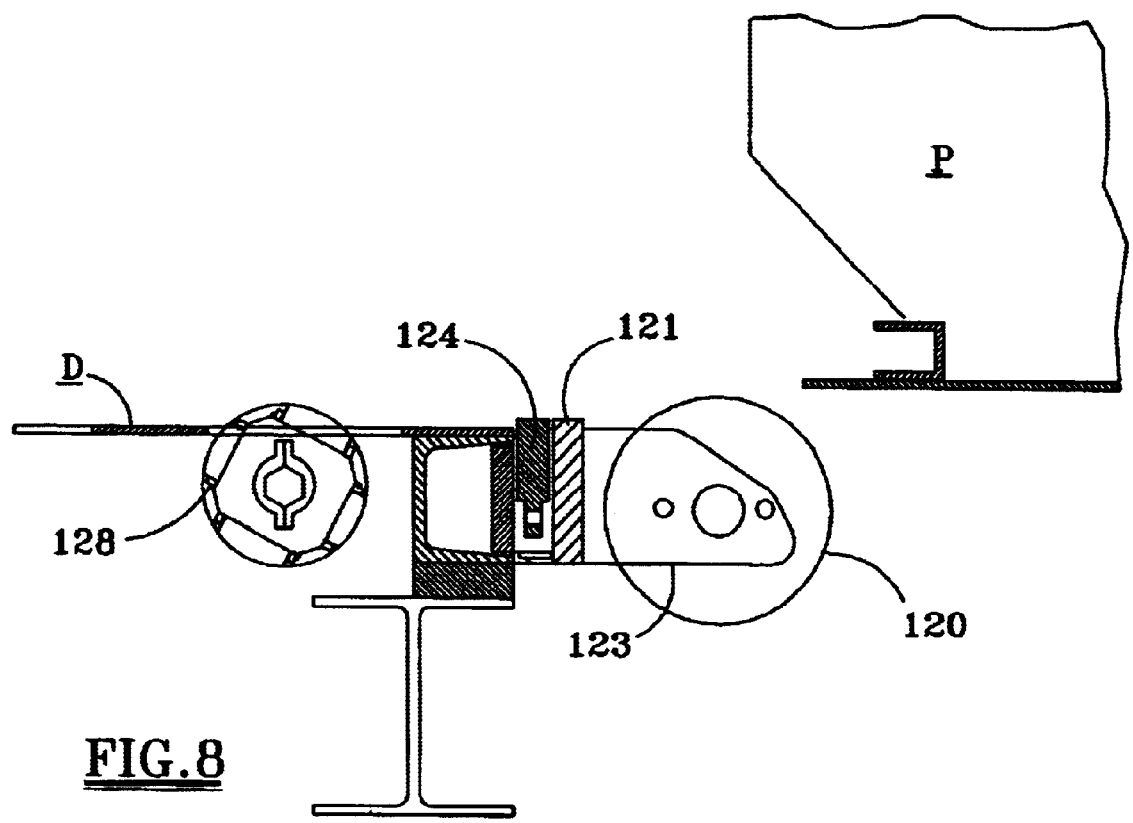
FIGS. 8 to 10 are enlarged cross sectional views of one side of the platform illustrating the function of the cylindrical rollers.
Figure 9:
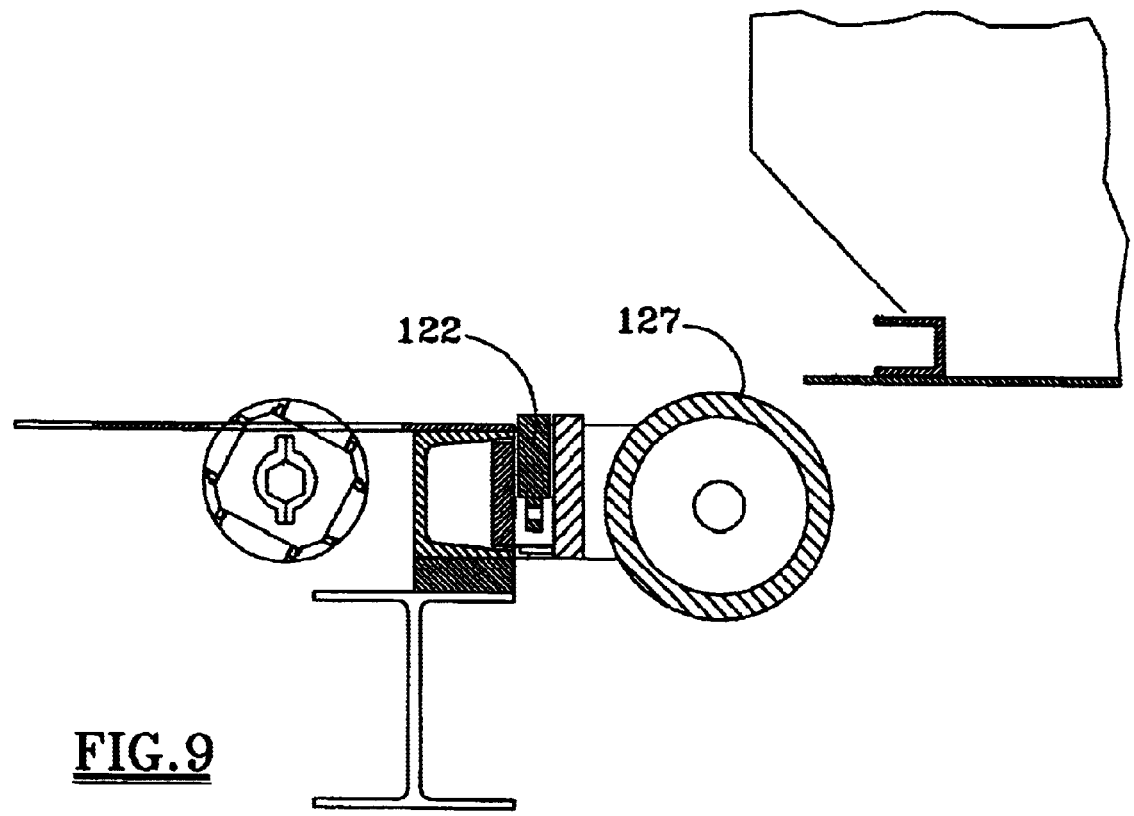
Figure 10:
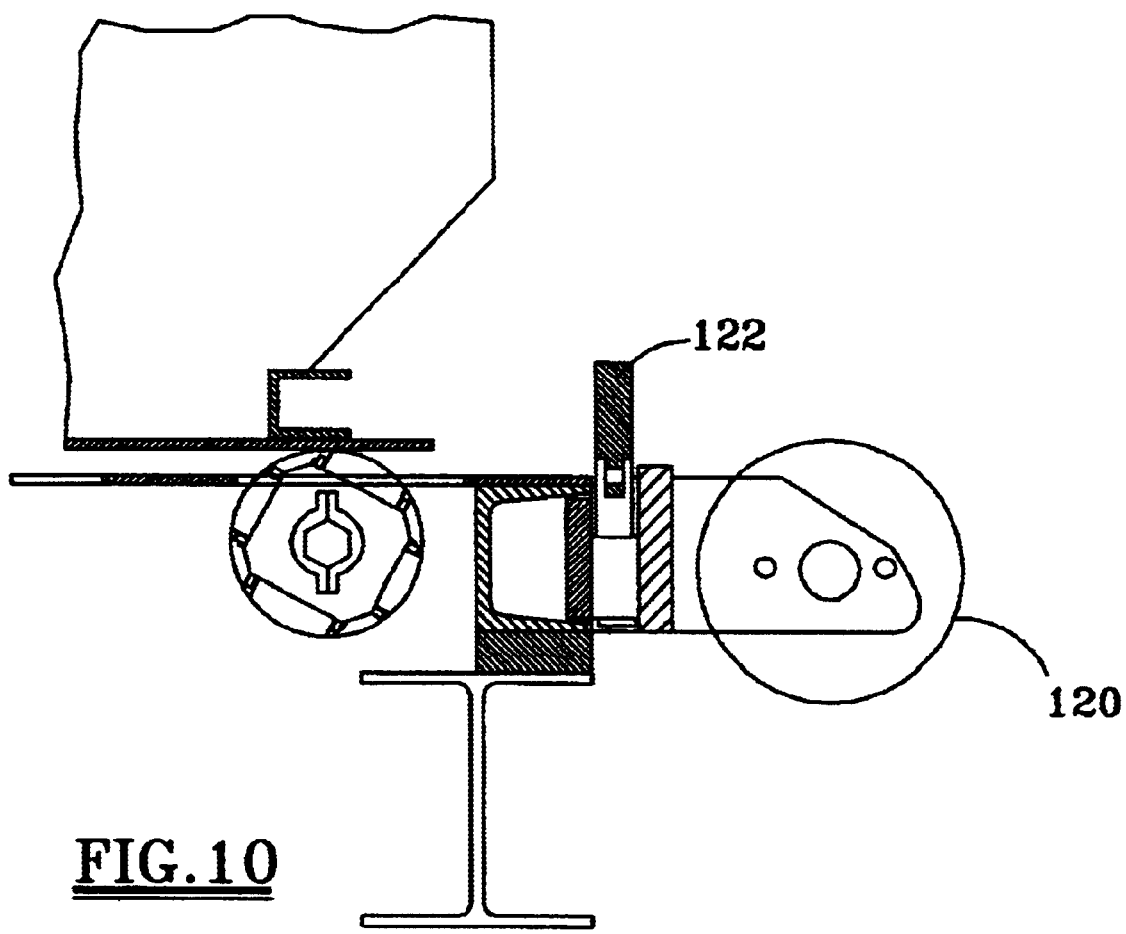

As shown in each of FIGS. 8 to 10, a pair of aligned cylindrical rollers 120 are mounted outward of the sides and rear end (away from the front end adjacent bridge 12) of the platform. As also shown, and described in detail to follow, elongate rails 121 are mounted on the platform intermediate the rollers on its sides and rear end. The cylindrical rollers are adapted to be rotated together in the same direction by means of a motor 122 attached to the end of one roller. As illustrated, there is only a single cylindrical rollers 120 driven by a single motor 121.

As shown in FIGS. 8 to 10, the cylindrical rollers are mounted on brackets 123 supported on the outside of adjacent rails. In accordance with another novel aspect of the invention, an elongate plate 124 is mounted in a longitudinal recess in the rail for vertical movement between a lower position (FIGS. 8 and 9) in which its upper end is generally aligned with, and in any case no higher than, the top surface of the cylindrical roller. In this way, a pallet P may be easily moved from a truck bed onto the deck of the platform, with assist from the rollers rotated in a counter clockwise direction.

When the container is moved by rollers 126 on the deck D into a position inboard of the rails, the plates 124 may be raised as shown in FIG. 10, so as to provide a barrier to movement of the cargo off the side of container deck. The plates may be raised and lowered within the recess of the rail by means of piston operator (not shown) or other suitable means.

It is further preferred that, the cylindrical rollers are made of rigid cores surrounded by a rubberized or similarly tacky surface 127 (FIG. 9). An example of a suitable rubber surface is a vulcanized roll coating such as are well known in the art. Together, the larger diameter and tacky surface of transfer rollers enables the rolls to "pick up" cargo from a truck deck that is significantly lower than the platform deck, and thus increase the range of height differences between the truck and platform decks that can be accommodated. Since the rollers are motor-driven, when the leading edge of a container or pallet is forced into contact with their surface, they tend to lift and advance the container or pallet onto the loader platform. The preferred large diameter rolls described herein allow alternative mechanical means for leveling the platform with a truck deck, such as hydraulic systems of the prior art, to be eliminated.

While preferred embodiments of this invention have been shown and described, modifications thereof can be made by one skilled in the art without departing from the spirit of teaching of this invention. The embodiments described herein are exemplary only and are not limiting. Many variations and modifications of the system and apparatus are possible and are within the scope of the invention. For example, additional row, additional roller wheels and/or additional motors can each be included without departing from the scope of the invention. Likewise, one or more groups, roller wheels or motors can be removed, so long as the basic operation of the present device is not affected. Accordingly, the scope of the protection is not limited to the embodiments described herein, but is only limited by the claims which follow, the scope of which shall include all equivalents of the subject matter of the claims.

What is claimed is:

1. A platform for use in loading and/or unloading one or more cargo containing objects such as containers or pallets onto or from an adjacent surface, including;

a deck having one end disposable adjacent the surface, an opposite end and longitudinally extending sides, and an array of roller assemblies rotatably mounted on the deck in position to support the objects, including first and second groups of laterally spaced, generally parallel roller assemblies each along a side of the deck and selectively rotatable in opposite directions about longitudinal axes in order to move an object longitudinally onto or off of the deck, third and fourth groups of roller assemblies extending longitudinally along the inboard side of each of the first and second groups, and selectively rotatable in opposite directions about lateral axes, whereby, those of the third and fourth sets may be rotated with one another in the same direction or in the opposite direction, and a fifth group of roller assemblies extending longitudinally between the third and fourth groups and having a pair of longitudinally spaced portions each portion including laterally spaced and long extending sets with each set being selectively rotatable in the same or different directions as the other, and means for rotating the roller assemblies in such a manner that an object may be loaded longitudinally from the adjacent surface onto the deck or from the deck onto the adjacent surface or from the surface onto the platform by rotation of third and fourth groups of roller assemblies in the same direction as one another, as the first, second and fifth groups remain passive, and, when loaded on the deck, the object may be rotated about a vertical axis centered generally equidistant the sets of the fifth group as well as equidistant the third and fourth groups by simultaneous rotation of the roller assemblies of the third and fourth groups in opposite rotational directions with respect to one another and rotation of the assemblies of the spaced portions of the fifth group in the opposite directions with respect to one another.

2. As in claim 1, wherein, there are a pair of sets in the fifth group which are longitudinally aligned and in spaced relation, with the rollers of the sets being rotatable about longitudinally spaced centers in opposite directions, whereby each of a pair of relatively small objects may be rotated about a center independently of the other object and thus in the same or opposite rotational direction.

3. As in claim 2, wherein, there are a pair of third and fourth groups which are longitudinally aligned and whose roller assemblies are driven independently of the other so that a larger object may be rotated about a center between adjacent ends of each of the pairs of the fifth group.

4. As in claim 1, including, a rail along each side and the other end of the platform, and a cylindrical roller rotatable about a longitudinal axis outward of each rail and having its upper surface on generally the same level on that of the roller assemblies and rail.

5. As in claim 4, including a longitudinal plate mounted within each rail; and means by which the plate may be raised or lowered between positions in which its upper end is generally on the same level as the upper surface of the roller assemblies, when an object is to be moved onto or off of the deck, and in which its upper end is above the deck to provide a barrier to an object which is on the deck.

* * * * *